July 27, 1954  H. ALLEN  2,684,596
PLUG VALVE ACTUATOR
Filed Dec. 3, 1949

Herbert Allen
INVENTOR.
BY Browning & Simms
Attorneys

Patented July 27, 1954

2,684,596

UNITED STATES PATENT OFFICE 2,684,596

PLUG VALVE ACTUATOR

Herbert Allen, Houston, Tex., assignor to Cameron Iron Works, Inc., Houston, Tex., a corporation of Texas Application December 3, 1949, Serial No. 130,972

4 Claims. (Cl. 74—22)

1

This invention relates to improvements in plug valves and actuators therefor and refers more particularly to that type of valve wherein the plug valve element which controls flow through the valve body, upon actuation, is moved endwise along its rotational axis, is rotated and is then moved endwise in an opposite direction to the initial endwise movement.

Usually in this type of valve, the plug valve element is frusto-conical in shape and is adapted to engage a correspondingly shaped seat carried by the valve casing. To either open or close the valve, it is desirable that the first movement of the element be primarily an endwise movement in an unseating direction. The following movement should be predominantly rotational to adjust the passageway through the plug valve element to opened or closed position. The last portion of the plug valve element movement should be predominantly endwise to reseat it. This type of actuation provides two primary advantages, namely, it facilitates actuation of valves where the plug valve element tends to stick in its seat and secondly, it prevents scoring of either the valve element or valve seat circumferentially or in the direction of flow.

A good many different actuating mechanisms have heretofore been devised to effect substantially the proper sequence of desirable movement, as set out above, but these mechanisms have not been entirely satisfactory due to their complication which results in short life, high cost, complicated mode of operation, and the like.

An object of this invention is to provide in a plug type valve a simple, rugged, inexpensive, and easily operated mechanism for actuating the plug valve element in the manner above set forth.

Another object is to provide a valve of the character described wherein rotation of the actuating shaft in but a single directional sense effects a shifting of the plug valve element from one operational position to the other.

A further object is to provide a valve of the character described having an actuating mechanism employing crank and crank follower parts for connecting an actuating shaft with the plug valve element wherein the follower parts, upon rotation of the actuating shaft, are subjected to forces acting in a direction parallel to the rotational axis of the plug valve element and other forces normal to such axis and somewhat eccentric thereof.

Still another object is to provide in a valve of the character described an actuating mechanism having an actuating shaft coupled to the plug valve element with a simple yet rugged varying ratio coupling involving crank and follower parts wherein rotation of the actuating shaft at a constant speed in a single directional sense imparts the desired endwise and rotational movement to the plug valve element at varying ratios whereby the movement of the plug valve element in its two senses is such that the initial and final movement is predominantly endwise and the intermediate movement is predominantly rotative.

A still further object is to provide an actuating mechanism for valves of the character described which is adapted, when incorporated in a valve, to accomplish all of the above objects.

Other and further objects of this invention will appear from its complete description.

In the accompanying drawings, which form a part of the instant specification, are to be read in conjunction therewith, and wherein like reference numerals indicate like parts in the various views.

Figure 4:
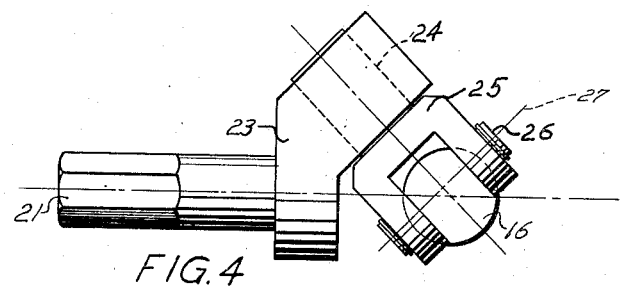
Fig. 4 is a top plan view, upon an enlarged scale, of the actuating mechanism of the valve shown in the preceding figures.

In the drawings, the numeral 6 designates a valve body constituting a part of the valve casing, the casing being completed by the bonnet 7 and cap 8. Body member 6 has the usual fittings 9 and 10 forming part of the flow passageway through the body and adapting the valve for connection in a conduit.

The body 6 has a hollow central section, frustoconically shaped, in which resides a liner or seat member 11. The seat member is positioned between shoulder 12 at the bottom of the hollow section and the underside of bonnet 7. A seal element, shown in the form of an O-ring 13, provides a seal for the joint between the body and bonnet at the upper end of the liner. The liner is provided with grooves surrounding the flow openings therein, in which are disposed packing means, which may be O-rings 14, for providing a seal between the liner and valve body about the flow passageway.

A tapered or frusto-conically shaped plug valve member 15 is mounted within the liner 11 for rotational and limited endwise movement. The confronting surfaces between the liner and plug valve element provide the seat surfaces therebetween. The plug valve element is provided with axially arranged extensions or a stem 16 which is journaled at its lower end in the body and the gland nut 17 and at its upper end in the bonnet 7 and in an opening in cap 8. These bearings and the stem provide a guide for maintaining alignment of the rotational axis of plug 15. Suitable stuffing box arrangements, as indicated at 18 and 19, provide a seal between the stem and valve casing.

Figure 1:
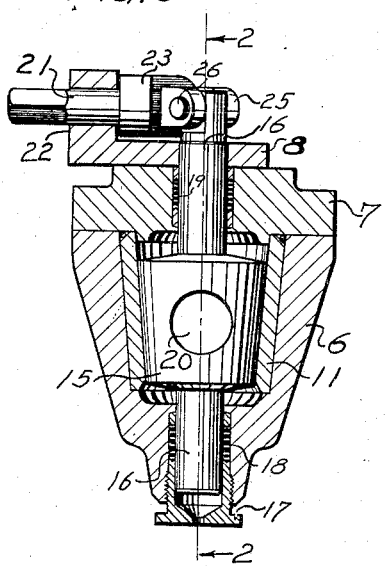
Fig. 1 is a vertical sectional view along a plane normal to a valve passageway illustrating a valve constituting an embodiment of this invention.
Figure 2:
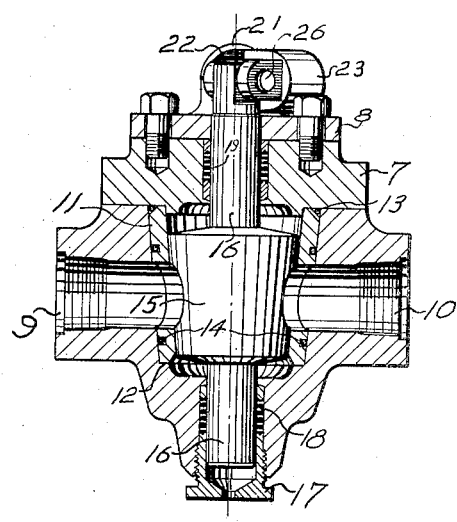
Fig. 2 is a vertical section of the valve shown in Fig. 1, taken along the line 2—2 in Fig. 1 in the direction of the arrows.

The plug valve element 15 has a passageway 20 therethrough which is adapted to align with the passageway through connections 9 and 10 when the plug valve element is in the position shown in Figs. 1 and 2 of the drawings. Upon rotation of the plug valve element through 90°, the passageway 20 is moved out of register with the main portion of the passageway through the valve body and a blank seat surface covers the openings in the valve liner 11. These two positions represent the open and closed operational positions of the plug valve element.

The actuating mechanism for the valve includes the stem 16 and a shaft 21 journaled in a bearing 22 carried by cap 8. The journal is such that the axis of rotation of shaft 21 is angularly disposed but intersects the rotational axis of the stem and valve plug member. Preferably, shaft 21 extends at right angles to the stem. The shaft is connected to the stem by a novel means including crank and crank follower means carried by the shaft and stem respectively, so as to provide a varying ratio coupling between the stem and shaft.

The crank and crank follower means may be of any character that will provide, upon rotation of the shaft 21, forces acting upon the stem in a direction parallel to the rotational axis of the stem and additional forces acting on the stem at an eccentric effective point and in a direction normal to the rotational axis of the stem. Such crank and follower means will be understood by those skilled in the art in view of this disclosure and may assume various forms.

The coupling illustrated in the drawings is preferred because of its simplicity involving a direct connection between the shaft 21 and stem 16. It includes a crank part 23 in the form of a crank arm having a journal opening 24 in its end extending at an angle of 45° to the rotational axis of shaft 21. This axis also intersects the point of intersection of the rotational axes of the shaft and stem 16. A yoke 25 has its tongue portion journaled in opening 24, the arrangement also permitting sliding endwise motion of the yoke in its journal. The arms of the yoke are pivotally connected to the stem at the out-of-round upper end thereof by a pivot pin 26 passing through registering openings in the yoke arms and the upper end of stem 16. The pivotal axis of pin 26 is perpendicular to the rotational axis of stem 16 but is spaced somewhat eccentrically thereof as indicated by the dotted line 27, and this pivotal axis is also perpendicular to the journal axis of the yoke tongue. The crank 23 and the yoke 25 together provide what may be described as a crank angularly disposed to the shaft.

Figures 3, 5:
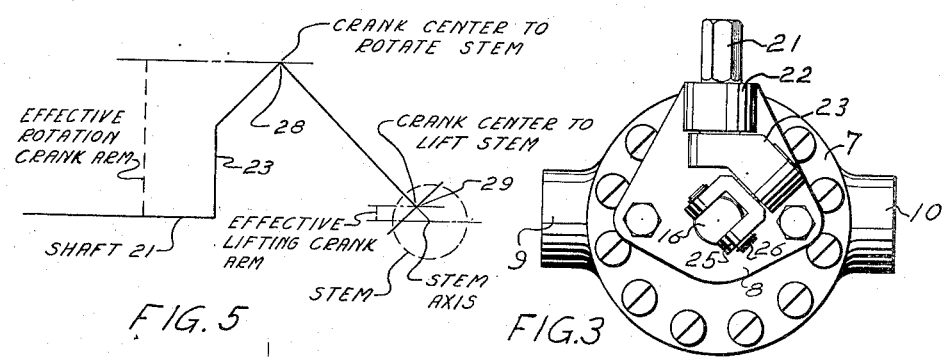
Fig. 3 is a top plan view of the valve shown in Figs. 1 and 2.
Fig. 5 is a schematic diagram of the actuating mechanism for the valve shown in the drawings.

It is believed that the crank parts and follower parts will be more readily recognized by referring to Fig. 5 wherein crank shaft 21 is shown schematically as a single line. The crank arm 23 is shown schematically by a single line and the effective crank center, from the standpoint of producing rotation of stem 16, is shown at 28. The projection from point 28 to shaft 21 represents the effective rotation crank arm. The follower part for producing rotation of the stem 16, in the embodiment shown in the drawings, then includes the yoke 25 with its connections between the stem and the crank arm 23. These connections provide for universal movement between the crank part and the stem and plug valve element.

Considering now the portion of the coupling between stem 16 and shaft 21, which induces an endwise movement in stem 16, the effective lifting crank center is designated by the numeral 29 and the effective lifting crank arm is the length of the projection of this point to the rotational axis of shaft 21. This is provided by the eccentricity of the mounting of pivot pin 26 in the stem.

In operation, a suitable wrench, hand wheel or the like is secured to the out-of-round end of shaft 21 and the shaft is rotated approximately 180° in one direction to move the valve plug element from one operational position to the other and is rotated approximately 180° in a reverse directional sense in order to move the valve plug element from its latter operational position to its original position. These respective rotations of the shaft effect a lifting, a turning and a seating of the plug valve element 15.

Assuming that the plug valve element is in its open operational position, as shown in Figs. 1 and 2, shaft 21 will be rotated counterclockwise, when viewed from the right in Fig. 1, in order to shift the plug valve member to closed position. As the shaft 21 commences to rotate, the first movement of stem 16 will be a rising movement for the effective lifting crank center will first commence to rise. Of course, after an infinitely small degree of rotation of shaft 21, the effective crank center for imparting rotation, shown at 28, will commence to have a lateral movement transversely or perpendicularly to the rotational axis of the stem. This imparts a force to the crank follower part 25 which is transmitted to the stem to produce rotation of the stem. The speed of rotation of stem 16 accelerates until the effective crank center 28 reaches the plane which includes the rotational axes of shaft 21 and stem 16. Further rotation of the shaft 21 to its position 180° disposed from its initial position imparts a decelerating rotational movement to stem 16. During this movement of shaft 21, the lifting or endwise movement imparted to stem 16 decelerates as the crank point 29 approaches the plane including the axes of shaft 21 and stem 16. As this point passes this plane, the endwise movement of stem 16 reverses in direction and accelerates to reach its maximum speed at the time the shaft 21 reaches its rotational position 180° disposed from its initial position.

It will be appreciated that with the arrangement provided by this invention, the initial and final movements of the stem 16 and plug valve element 15 will be predominantly endwise in reverse directions, to effect an initial raising of the plug valve member from its seat and finally, a reseating of the plug valve element. At this initial and final movement of the plug valve element, there will be some slight rotational movement, which in the minds of many skilled in the art, will facilitate the unseating and seating of the valve member. This is particularly important in arrangements wherein the liner 11 is dispensed with and the seal for the closed position of the valve member relies upon a ramming of the plug valve element tightly against a seat integral with the valve casing. Where the liner 11 is employed, the pressure differential between the outlet line pressure and the inlet line pressure serves to aid in the seating of the parts and the plug element does not need to be so tightly rammed against its seat.

An opening of the valve is effected by reversing the direction of rotation of shaft 21. Rotation in the amount of 180° of shaft 21 will effect a complete shifting of the plug valve element 15 from its closed operational position to its open operational position as viewed in Figs. 1 and 2.

It is contemplated that the journal of the yoke tongue in the crank arm 25 may be upon an axis which extends other than 45° from the rotational axis of shaft 21 but if so, the degree of rotation of plug 15 will be different and will equal twice this angle. As a practical matter, it will seldom be feasible for this angle to be outside the limits of 20° to 70°.

It will be seen that the objects of the invention have been accomplished. There has been provided a valve of the type described which is operated in a fashion normal to the operation of the usual plug and gate valves. This substantially eliminates the possibility of workmen improperly operating the valve which heretofore has been one of the chief objections to valves of this type. The construction is such that the operating mechanism is simple, rugged, and inexpensive. The arrangement is such that both endwise and rotational movements are imparted to the plug valve member at varying speeds by a constant rotational speed of the actuating shaft. These two movements are 90° out of phase with each other whereby the plug valve element is first moved predominantly endwise in an unseating direction, is then moved predominantly rotatively, and then is predominantly moved in an endwise seating direction.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a device of the character described, a stem adapted for concomitant axial and turning movements, a shaft journaled with its axis of rotation disposed normally to and intersecting that of the stem, and a crank follower means connecting the shaft and stem, said means including a crank arm mounted on the shaft, a yoke having its arms pivotally connected to the stem along a line normal to and spaced somewhat from the rotational axis of the stem and its tongue journaled in the crank arm, the axis of the latter journal extending at an angle of about 45° from the shaft's rotational axis and this latter journal permitting endwise movement of the yoke tongue relative to the crank arm.

2. In a device of the character described, a stem adapted for concomitant axial and turning movements, a shaft journaled with its axis of rotation disposed normally to that of the stem, and a crank follower means connecting the shaft and stem, said means including a crank arm mounted on the shaft, a yoke having its arms pivotally connected to the stem and its tongue journaled in the crank arm, the rotational axes of the shaft and stem intersecting at a common point with the axis of the tongue journal with the latter axis extending about 45° from said shaft axis, the pivoted connection between said yoke arms and the stem being along a line normal to said rotational axis of said stem and spaced intermediate said common point and said crank arm, the tongue journal permitting endwise movement of the yoke tongue relative to the crank arm.

3. In combination, a stem mounted for rotary and longitudinal reciprocation, a shaft journaled with its axis of rotation angularly disposed to and intersecting that of the stem, and a crank and follower means connecting the shaft and stem, said means having a crank arm mounted on the shaft, a link between the crank arm and stem, connected to the crank arm in a manner to maintain the angular relationship between the link and the crank arm and the link being pivotally connected to the stem on an axis substantially transverse to and spaced laterally from the rotational axis of the stem, said connections and link providing for variation of the distance between the crank arm and the axis of the pivotal connection to the stem.

4. In combination, a stem mounted for rotary and longitudinal reciprocation, an actuating shaft journalled on an axis angularly disposed to and intersecting the rotational axis of the stem, crank parts on the shaft and crank follower parts on the stem, one crank follower part having a connection with one crank part embracing it with a clearance substantially uniform at all times during longitudinal reciprocation of the stem for transmitting force therebetween in a direction parallel to the axis of the stem whereby the stem is shifted endwise along its rotational axis upon rotation of the shaft, and one crank follower part connected to one crank part so as to transmit force to the follower parts in a direction normal to the axis of said stem and eccentrically with respect to said stem axis whereby rotation of the shaft will induce rotation of the stem.

References Cited in the file of this patent

UNITED STATES PATENTS

| Number | Name | Date |
|---|---|---|
| 268,846 | Weller | Dec. 12, 1882 |
| 591,420 | Onderdonk | Oct. 12, 1897 |
| 1,737,082 | Gough | Nov. 26, 1929 |
| 1,894,196 | Reed | Jan. 10, 1933 |
| 2,125,810 | Reed | Aug. 2, 1938 |
| 2,149,725 | Canariis | Mar. 7, 1939 |
| 2,432,172 | Reed | Dec. 9, 1947 |
| 2,443,995 | Snyder | June 22, 1948 |
| 2,501,150 | Anderson | Mar. 21, 1950 |

FOREIGN PATENTS

| Number | Country | Date |
|---|---|---|
| 13,139 | Great Britain | June 24, 1899 |
| 215,926 | Switzerland | July 31, 1941 |